United States Patent

Szakurski

[11] Patent Number: 5,791,707
[45] Date of Patent: Aug. 11, 1998

[54] SNOW REMOVAL DEVICE

[76] Inventor: Joseph Szakurski, R.R. 2, Box 2109A, Stroudsburg, Pa. 18360

[21] Appl. No.: 704,385

[22] Filed: Aug. 22, 1996

[51] Int. Cl.⁶ .................. A01B 1/22; E01H 5/02
[52] U.S. Cl. .............. 294/54.5; 37/285; 294/51; 294/53.5
[58] Field of Search .............. 294/49, 51, 53.5, 294/54.5, 55–59; 15/257.1, 257.4, 257.7; 37/264–268, 241, 270, 271, 278, 284, 285, 434; 56/400.01, 400.04–400.06; 172/372–376; 403/98, 103, 104

[56] References Cited

U.S. PATENT DOCUMENTS

| | | | |
|---|---|---|---|
| 300,870 | 6/1884 | Immel . | |
| 364,313 | 6/1887 | Skillin | 294/55 |
| 992,972 | 5/1911 | Meadows | 294/53.5 |
| 1,176,531 | 3/1916 | Fite et al. | 294/53.5 |
| 1,196,206 | 8/1916 | Bulger et al. . | |
| 1,319,912 | 10/1919 | Starrett et al. . | |
| 1,572,824 | 2/1926 | Tatge . | |
| 1,712,135 | 5/1929 | Cipko | 294/51 X |
| 1,940,169 | 12/1933 | Hinton | 172/372 |
| 2,089,245 | 8/1937 | Barron . | |
| 2,100,379 | 11/1937 | Cervenka et al. . | |
| 2,239,297 | 4/1941 | Allen et al. . | |
| 2,486,434 | 11/1949 | Plummer | 294/51 |
| 3,091,790 | 6/1963 | Schroeder . | |
| 3,154,336 | 10/1964 | Nelson | 294/54.5 X |
| 3,155,413 | 11/1964 | Holombo | 37/265 |
| 3,218,738 | 11/1965 | Bowerman . | |
| 3,483,643 | 12/1969 | Wenzel . | |
| 3,583,747 | 6/1971 | Lambert . | |
| 3,727,964 | 4/1973 | Nordvik . | |
| 3,773,375 | 11/1973 | Nehls . | |
| 3,998,486 | 12/1976 | Mittelstadt . | |
| 4,089,127 | 5/1978 | Maijala . | |
| 4,185,403 | 1/1980 | Hardgrove | 37/268 X |
| 4,193,626 | 3/1980 | Vondracek | 294/53.5 X |
| 4,249,767 | 2/1981 | Andreasen . | |
| 5,083,388 | 1/1992 | Cooley . | |
| 5,465,510 | 11/1995 | Goodnough et al. . | |
| 5,577,786 | 11/1996 | Laine | 294/54.5 |

FOREIGN PATENT DOCUMENTS

| | | | |
|---|---|---|---|
| 170697 | 3/1960 | Sweden | 294/53.5 |
| 544998 | 5/1942 | United Kingdom | 294/55 |

*Primary Examiner*—Johnny D. Cherry
*Attorney, Agent, or Firm*—Charles A. Wilkinson

[57] ABSTRACT

A snow moving device which can assume the configuration of a roof snow scraper, a snow pusher or plow, and a conventional shovel, comprising a handle connected to a planar rectangular blade via a plurality of support arms, the blade incorporating arcuate opening or channel cut out sections allowing the blade to pivot on the support arms in response to the direction of the device when the device is being used as a roof snow scraper, pusher or plow, the blade also having the ability to be fixed in position for use as a shovel.

19 Claims, 11 Drawing Sheets

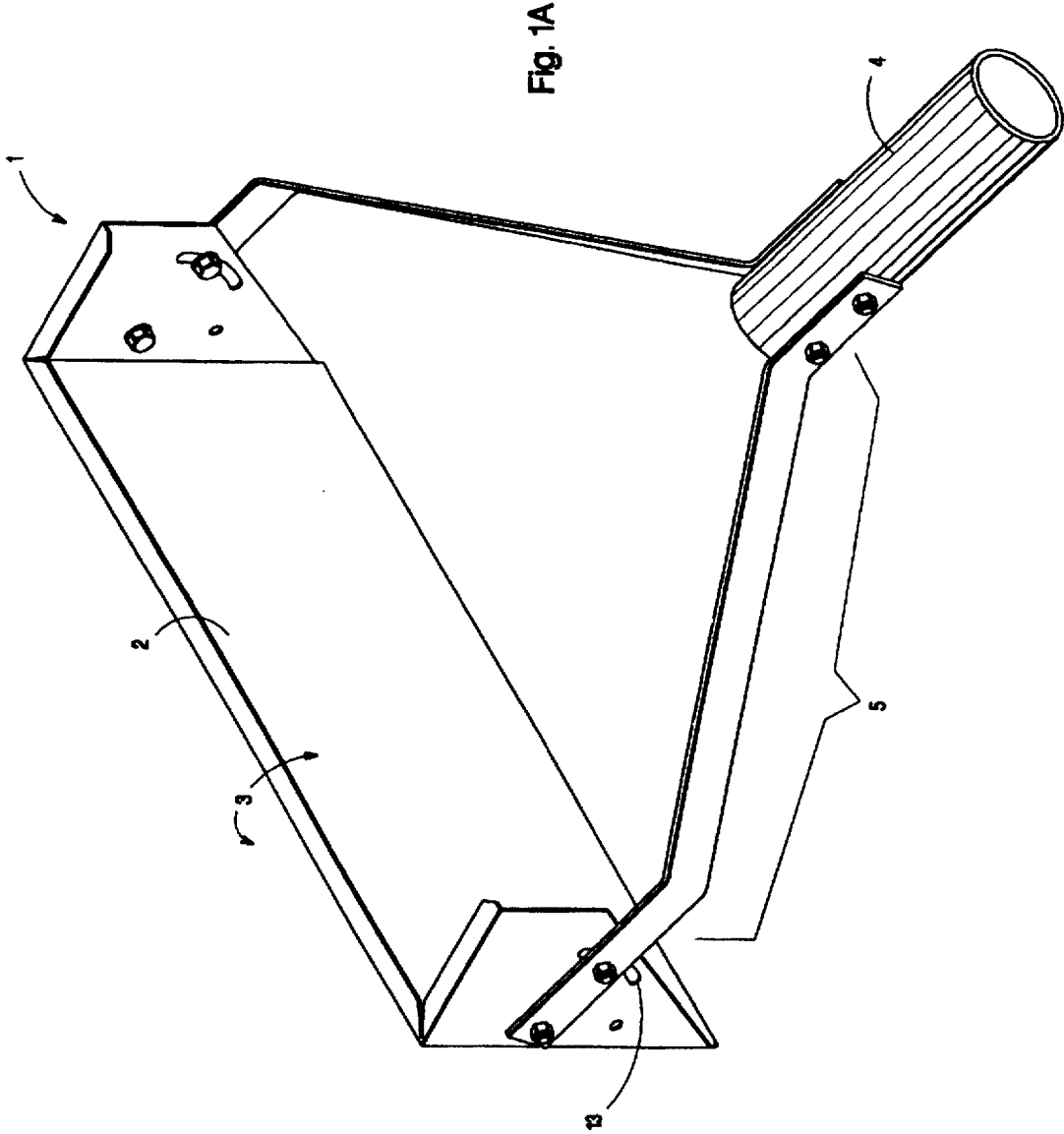

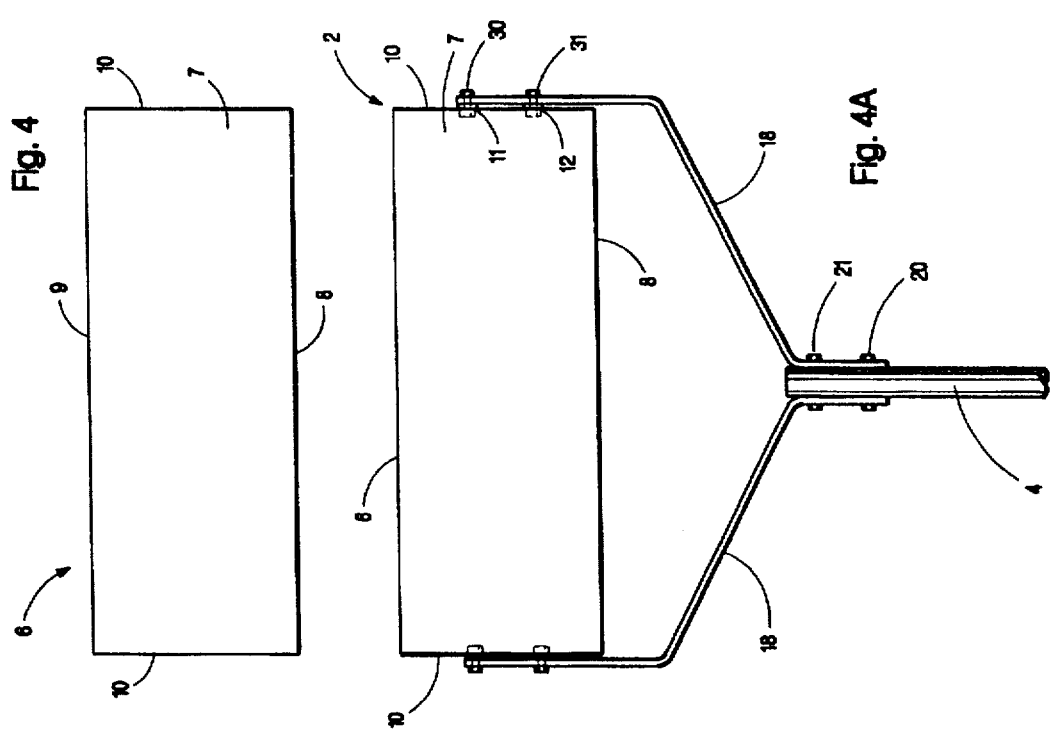
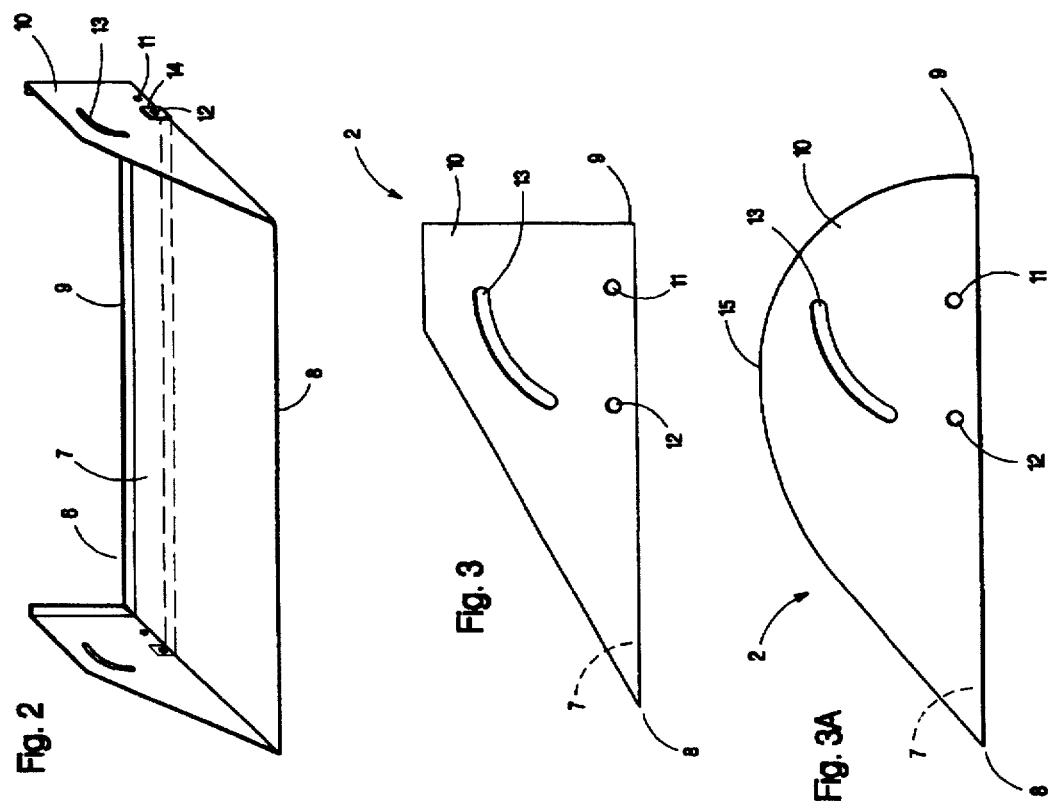

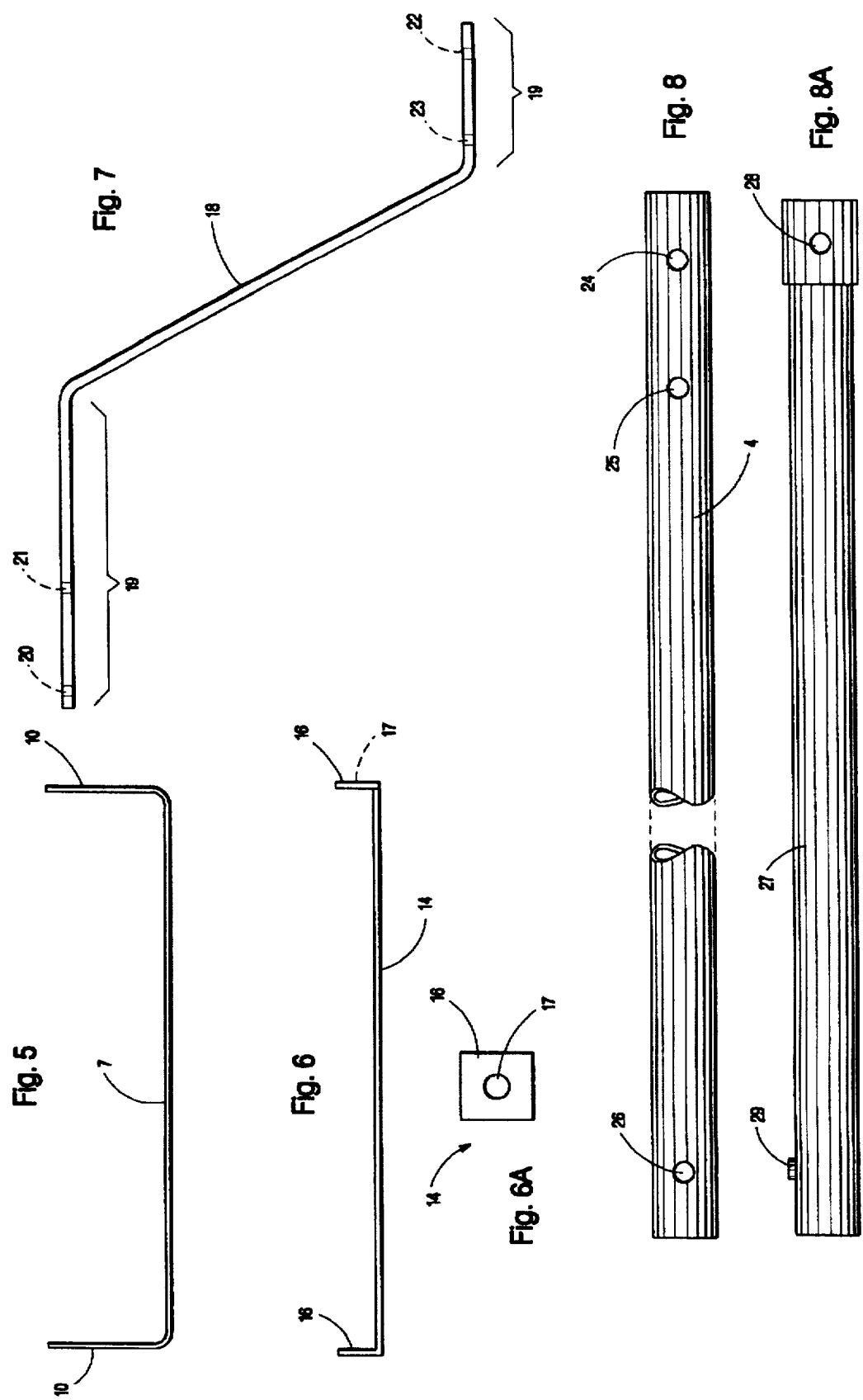

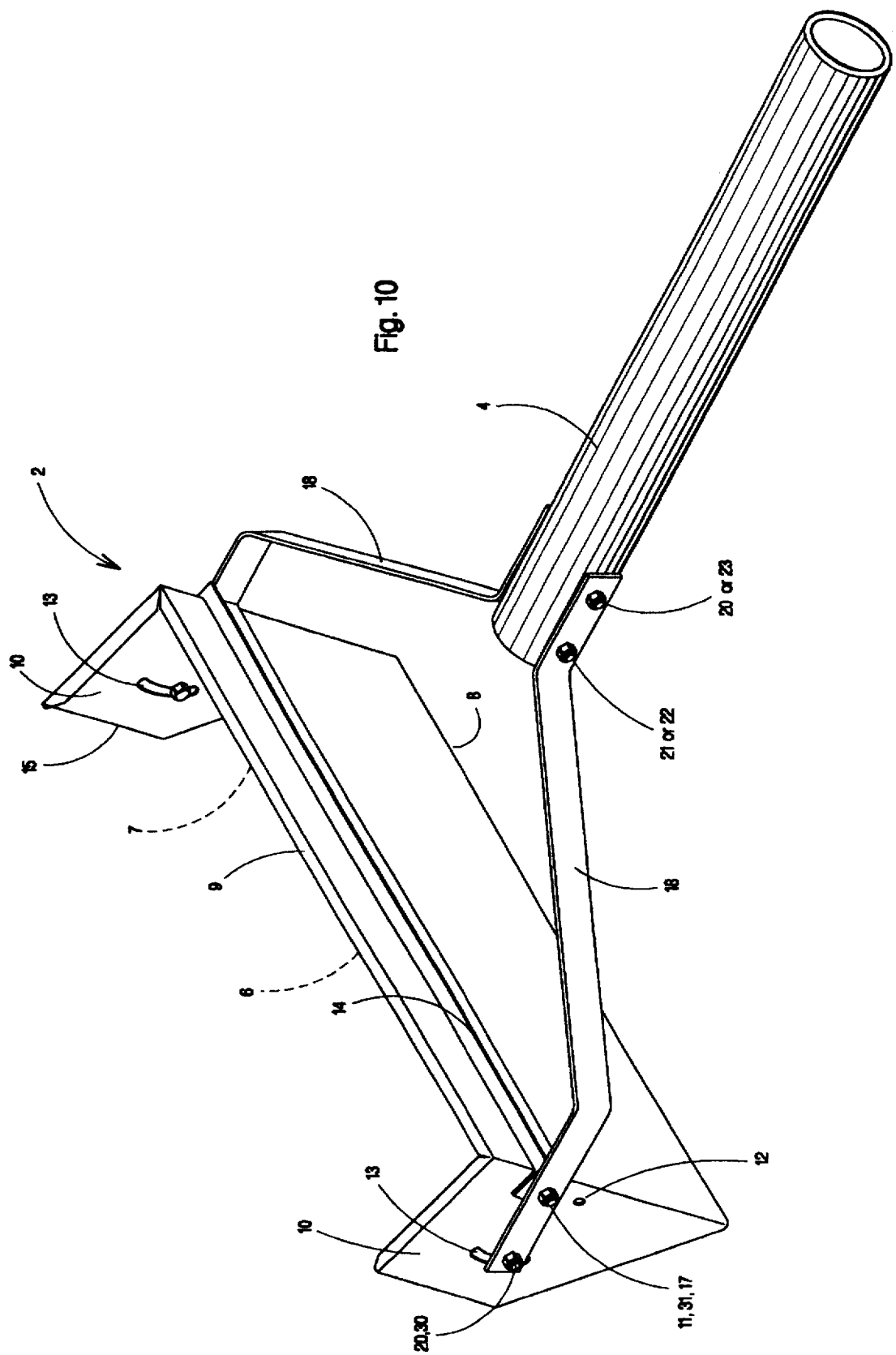

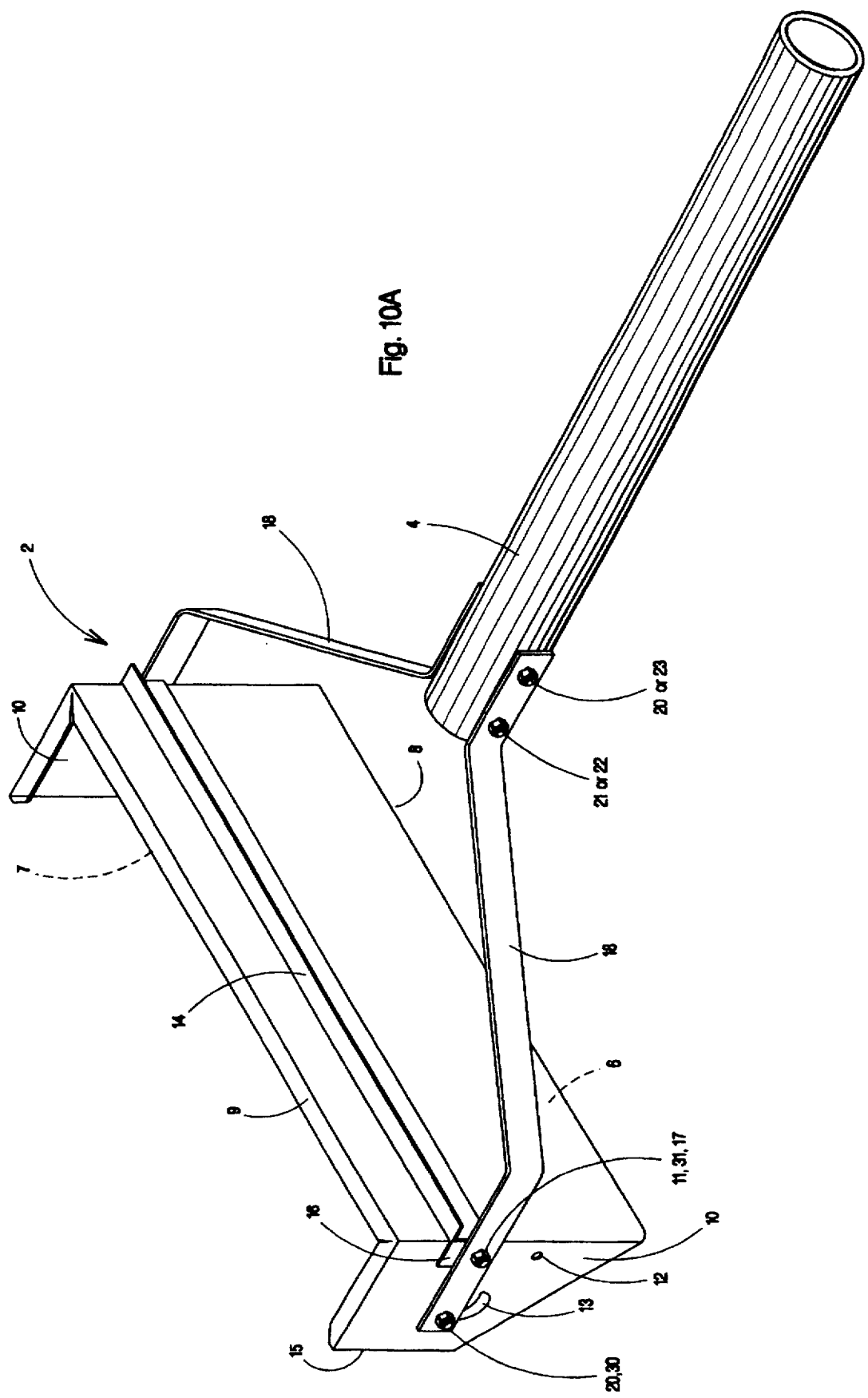

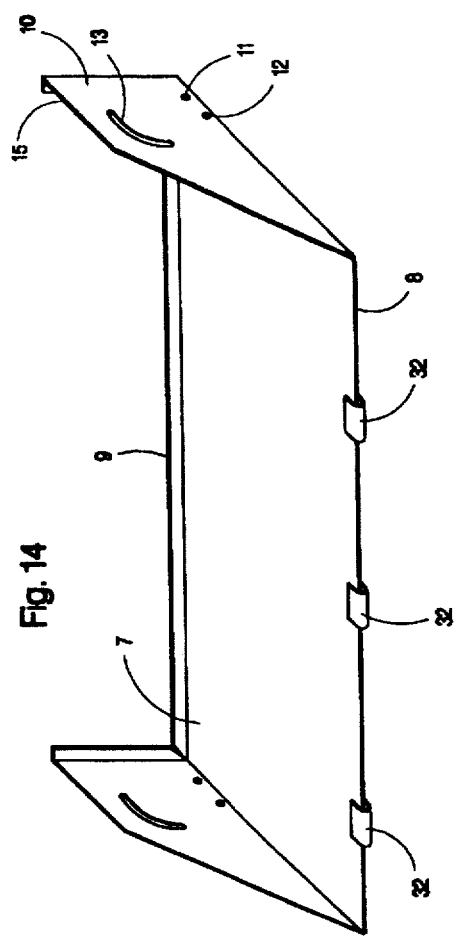
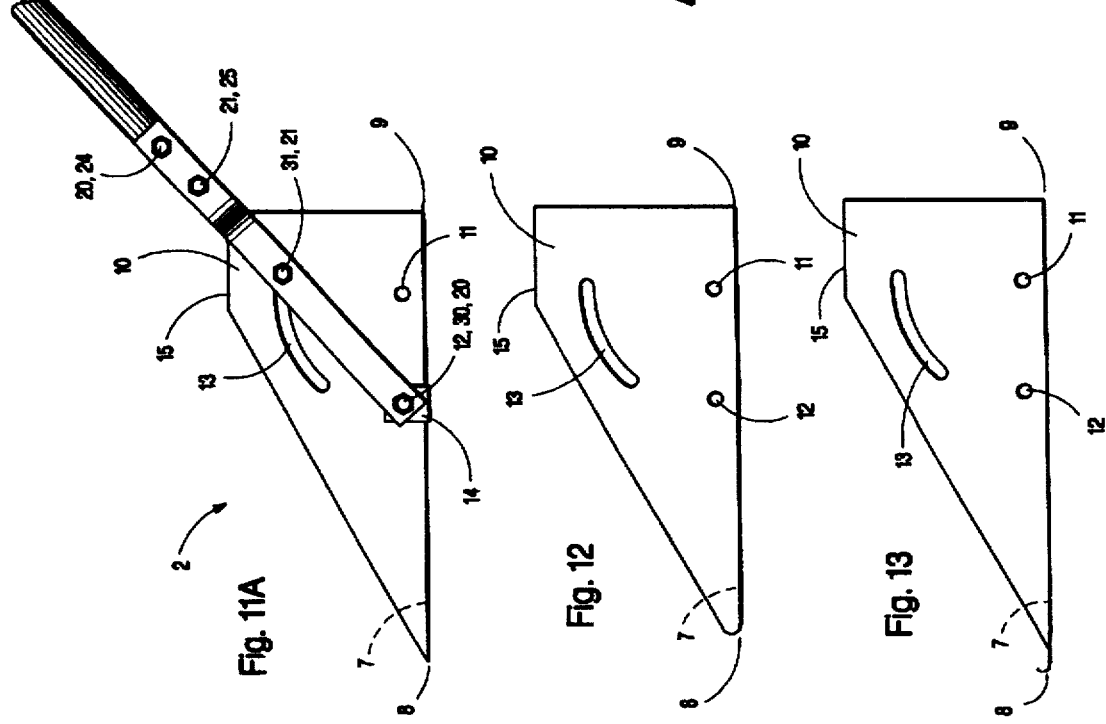

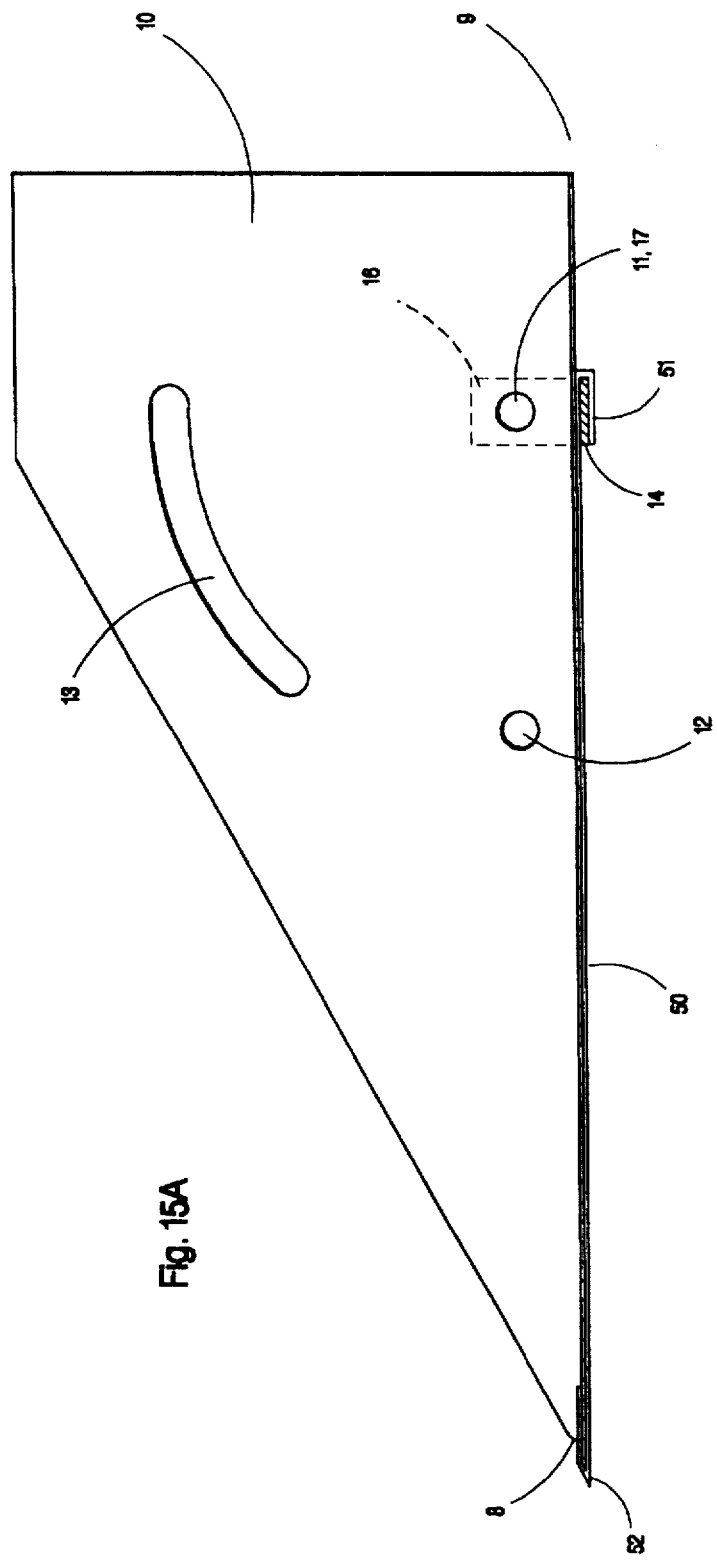
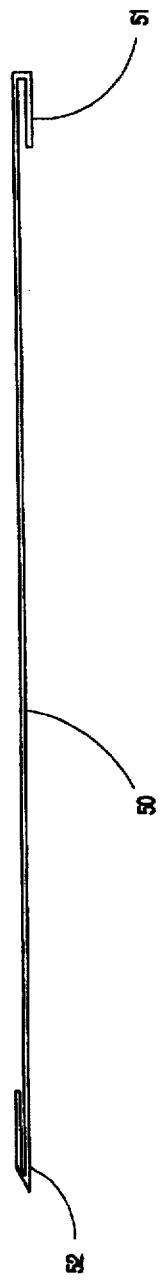

SNOW REMOVAL DEVICE

FIELD OF THE INVENTION

This invention relates generally to snow removal and more particularly to devices for removing snow from the ground, as well as from rooftops, and which are capable of adapting to being used as a scraper, pusher (plow) or shovel.

BACKGROUND OF THE INVENTION

Snowfall, especially in the Northern regions of the country, can be a debilitating natural phenomenon. A large enough snowfall can close major roadways, make walking, riding or driving extremely dangerous, completely blanket one's only form of transportation, and trap housebound families for days.

A major concern for both homeowners and businessowners is the collection of excessive snow and particularly wet, heavy snow upon their roofs and eaves. Especially during successive snowfalls when there is only partial melting between accumulations, layers of snow and ice can place extreme weight upon the upper exterior or roof of a structure. This weight can eventually lead to a complete collapse of the roof structure, and subsequent damage to both the interior and exterior of the building. Therefore, it is imperative that snow be removed from many roofs after a heavy snowfall so as to lessen the weight and prevent a potential disaster.

A device for removing snow from roofs and the like should be easy to use, easy to manufacture, lightweight, and adaptable for different sized roofs. For small slanted roofs, an ideal removal device would involve a scraper which can be used from the ground and which "scrapes" or pulls the snow from the roof. However, in order to be effective, such a scraper device must also be so constructed as to be easily pushed up the roof over the snow on such roof. Such a scraper might be configured, for example, to slide over the snow when pushed up the roof, but to dig into the snow so that the snow is pulled downward as the device is pulled downward.

For larger buildings where access to the roof is possible, a more appropriate arrangement might involve pushing the snow off the roof. Pushing the snow off a roof in a forward motion, such as with a snow plow configuration where the blade is somewhat perpendicular to the handle, might also be effected with a conventional shovel arrangement, where the blade is more horizontally aligned with the handle of the device. A shovel arrangement is also useful if the roof is surrounded by a barrier which makes pushing the snow off impossible.

An ideal snow removal device would be adaptable to each of the above mentioned situations. It would be able to act as a scraper, a pusher and a conventional shovel, depending on the environmental demand. The interchangability should be an inherent aspect of the device, requiring no additional parts or tools when converting from one configuration to the next. Finally, the device should be constructed so that it can be easily disassembled and stored during the warmer seasons.

DISCUSSION OF THE PRIOR ART

Snow removal devices of the past have, in general, fallen into several different genres. The conventional ground-based fixed snow shovel evolved into devices that are adjustable between a shovel and a plow or pusher. The conventional roof snow removal device began as a dedicated scraper and evolved into devices that pivot on their handle depending on the direction of the device along the roof. An alternative to the scraper series of devices is what may be denoted as the cutter series, which, in effect, utilize a blade which is pushed through the snow and "slices" sections of snow off the roof.

One of the earliest devices, depicted by U.S. Pat. No. 1,196,206 issued Aug. 29, 1916 to Bulger and Offerman entitled "Snow Scraper", discloses a curved blade pivotally connected to a handle, where the entire blade can be both laterally and vertically adjusted with respect to the handle. Even though it is designed primarily for use on the ground, the Bulger et. al. device laid the foundation for combination scraper/pusher snow removal devices. Other ground-based devices, depicted in U.S. Pat. No. 1,319,912 issued Oct. 28, 1919 to Starrett and Round entitled "Combined Snow Pusher and Shovel" and U.S. Pat. No. 2,239,297 issued Apr. 22, 1941 to Allen entitled "Snow Shovel", disclose slidably hinged configurations which convert conventional snow shovels into snow pushers. However, an expansion in the art occurred in the wake of these ground-based devices to meet the demands of roof snow removal. An early disclosure which discusses roof snow removal will be found in U.S. Pat. No. 1,572,824 issued Feb. 9, 1926 to Tatge entitled "Scraper", which depicts an adjustable blade device where the scraper is connected to the handle via a ball and socket joint.

Other early methods of roof snow removal involved stationary non-pivoting devices attached to elongated handles:

| Non-Pivoting Roof Snow Removal | | |
|---|---|---|
| Number | Inventor | Issue Date |
| 3,091,790 | Schroeder | 06-04-1963 |
| 3,218,738 | Bowerman | 11-23-1965 |

The devices shown in these patents are dedicated to the scraping of snow and ice from a roof while the user is standing on the ground, and may not assume the configuration of a shovel or a pusher. Aside from generally assuming the shape of a somewhat curved scoop, both of these devices contain one unique characteristic: the Schroeder device contains a toothed edge on one side of the blade which is used to break any accumulated ice that has formed on the roof, and the Bowerman device employs a protective spacer on the edge of the blade to protect the surface of the roof from the sharp scraping edge of the device.

The ability of the device to accommodate different environments and the needs of the user led to the evolution of an adjustable roof snow removal device.

| Adjustable Roof Snow Removal | | |
|---|---|---|
| Number | Inventor | Issue Date |
| 3,483,643 | Wenzel | 12-16-1969 |
| 3,583,747 | Lambert | 06-08-1971 |
| 3,727,964 | Nordvik | 04-17-1973 |
| 3,773,375 | Nehls | 11-20-1973 |

The Wenzel and Lambert patents disclose a blade which pivots from a horizontal, closed position as the blade is forced up the roof and over the top of the snow, to an open, vertical position as the blade is pulled down through the snow toward the user. The Wenzel device pivots along the entire length of the top of the blade, and is further connected to the handle by chains on each side of the blade which restrict its pivotal movement to approximately 90° from the horizontal which defines the handle. The Lambert blade is connected to, and pivots on, the handle at the center of the blade, where an L-shaped member in combination with the handle define the blade's rotational movement. The Wenzel and Lambert devices only have the capacity to scrape snow from a surface.

The Nordvik device manually adjusts between a shovel and a scraper. However, the entire blade must be removed from the handle and re-fastened in order to accomplish the two different tasks. The blade of this device does not automatically adjust in response to its direction along the roof (as do the blades of the Wenzel and Lambert devices), nor does it pivot in any fashion. Finally, the Nehls device accommodates different environments by adjusting the angle of the middle of the elongated handle. Similar to the Nordvik device, this adjustment must take place manually.

An entirely different philosophy in snow removal devices evolved in the middle 1970's which attacked the roof snow removal problem by cutting into the snow and "sectioning" the snow from the roof. These devices are constrained to roof snow removal, and, for obvious reasons, can not be employed as a pusher or a shovel.

| Cutter Method Roof Snow Removal | | |
|---|---|---|
| Number | Inventor | Issue Date |
| 3,998,486 | Mittelstadt | 12-21-1976 |
| 4,089,127 | Maijala | 05-16-1978 |
| 4,249,767 | Andreasen | 02-10-1981 |
| 5,083,388 | Cooley | 01-28-1992 |

With the exception of the Andreasen device, each of the devices disclosed in the above patents employs a cutting device, whether a rod or the edge of a blade, which is pushed through the snow and is connected to an elongated flexible sheet which slidably carries the cut snow from the roof. The Andreasen device discloses a curved blade pivotally connected to a U-shaped extension of the handle. The placement of the blade is close enough to the bottom of the wheeled device so as to act as a cutter when the device is pushed upward through the snow, and the curved portion pivots to a scraper in response to the device being pulled down the roof. The Andreasen device appears to be a combination of the scraper and cutter philosophies, although it does not contain a plastic snow carrying device. Each of the cutter devices also contains a means to vertically cut the snow, whether it be in the form of a U-shaped (Mittelstadt, Andreasen and Cooley) or inverted U-shaped (Maijala) body.

U.S. Pat. No. 5,465,510 issued to S. Goodnough et al. discloses one of the most recent roof snow removal devices to obtain patent protection. The Goodnough device does not pivot, nor is it adjustable, but is basically a combination of the blade from Nehls, the plastic tabs/protectors from Bowerman, and the wheels from Mittelstadt. It also appears to be a wheeled version of the Roof Rake presently sold by Brookstone, Inc. and advertised in the Brookstone® catalog with the addition of protective plastic tabs on the bottom of the blade.

There are some tools which appear similar in design to several of the above-mentioned devices, although not directly related to the process of snow removal. For all intents and purposes, the following devices for moving various materials could be placed in the previous discussion had their inventors conceived of snow removal as an object of their invention.

| Devices Not Containing Disclosures Directed To Roof Snow Removal | | |
|---|---|---|
| Number | Inventor | Issue Date |
| 300,870 | Immel | 06-24-1884 |
| 992,972 | Meadows | 05-23-1911 |
| 2,089,245 | Barron | 08-10-1937 |
| 2,100,379 | Cervenka | 11-30-1937 |

The Immel device, used for cleaning or scooping out drains, discloses a scoop adjustably connected to a handle, where the angle of the bottom of the scoop with respect to the handle can be varied in such a way as to allow the user to operate the scoop as though it were a conventional bulldozer. For all intents and purposes, this device could have been used to remove snow from a roof, or any other surface for that matter.

The Meadows device, used for scooping grain, looks remarkably similar to the Starrett and Round snow pusher and shovel. However, Meadows employs the device as a pusher, whereby the blade assumes a vertical position as the device is pushed "against the grain", and slides to a horizontal position as the device is pulled toward the user across the top of the "grain." The concept is basically the same. Again, there is perhaps no reason why this "Grain Scoop" could not be used for snow removal.

The Barron device, used as a mining tool, is almost identical to the Lambert snow removing apparatus, and also features pointed cleats which allow the device to ride over the ground and direct loose particles over the blade as the blade is pushed into a mine shaft. The Andreasen device essentially distributes the snow over the curved blade in a similar fashion. The Cervenka horticultural device is also very similar to the Lambert device, and when comparing the two side by side, it seems clear that Cervenka would have constituted prior art with respect to the Lambert patent. The Cervenka blade has a greater range of motion and contains both a solid side and a rake-like side.

The above mentioned prior art devices all lack the ability to form three major configurations of snow removal devices, i.e., scraper, pusher, shovel, in an easy and efficient manner. Having the ability to switch between ground and roof use in one tool alleviates the need to stockpile three different tools for the three different snow removal operations. Most of the prior art devices that are relatively adaptable or convertible are fairly complex, and would require some mechanical know-how to operate effectively. There is no device on the market or within the prior art, so far as the present inventor is aware, which is easy to use, simple to operate, is comprised of a minimal number of parts, and can be used on a roof as well as the ground as a scraper, pusher and shovel.

OBJECTS OF THE INVENTION

It is an object of the present intention, therefore, to provide a device for removing snow from roofs and the ground, and which is capable of being used as a scraper, pusher (plow) or shovel.

It is still a further object of the present invention to provide a device which can be locked or fastened individually in the configuration of a scraper, pusher or shovel.

It is still a further object of the present invention to allow a user standing on the ground to clear snow from a rooftop by scraping the snow off the roof.

It is still a further object of the present invention to allow the scraping blade of the device to pivot freely on the handle so as to accommodate the direction of the device along the roof so as to make for the most efficient clearing action.

It is still a further object of the present invention to provide a device which can accommodate any height roof and/or user by providing for extensions to the handle.

It is still a further object of the present invention to allow a user standing on a roof to clear snow from the rooftop by pushing the snow off the roof.

It is still a further object of the present invention to allow a user standing on the ground to clear snow from the ground by pushing the snow out of the way.

It is still a further object of the present invention to allow a user standing on the ground to clear snow from the ground by shovelling the snow out of the way.

It is still a further object of the present invention to allow a user to change configurations of the device of the invention without the addition of any extra elements or components.

It is still a further object of the present invention to provide a device which is adaptable to ground and roof use with little or no tools required.

It is still a further object of the present invention to provide a device which is relatively lightweight, easy to use, easy to manufacture, and is capable of compact, easy storage during the off season.

BRIEF DESCRIPTION OF THE INVENTION

This invention comprises a snow removal device having four main components, namely a handle structure comprising a plurality of support members, a planar blade and two sets of bolts. The planar blade has angled side walls. The support members provide the actual connection between the handle and the blade. The two sets of bolts provide interchangability between roof and ground use. The device is adaptable to various configurations for several uses.

During the scraper configuration, one set of bolts is fastenably connected to the support members through the sides or side walls of the blade, while the other set of bolts is loosely connected to the support members through arcuate channels on the blade, allowing the blade to slidably pivot to various angles when used on a roof while the user is standing on the ground; the scraper blade assuming a more or less angular position when pushed up the roof over the snow, and then pivoting to a more or less vertical position with the surface of the blade facing the user when pulled downward through the snow. During the pusher or plowing configuration, one set of bolts is fastenably connected to the support members through the sides of the blade, while the other set of bolts is fastenably connected to the handle through arcuate channels on the blade, maintaining the blade in a somewhat vertical position with the surface of the scraper facing away from the user. During the shovel configuration, both sets of bolts are fastened to the handle through the sides of the blade, as opposed to one set being fastened in the arcuate channel, while the scraper is in the horizontal position with the surface of the blade facing the upward or toward the sky to create a conventional ground shovel. An alternative preferred embodiment of the shovel configuration has the second set of bolts fastened through arcuate channels so that the blade is angularly disposed from the longitudinal axis of the handle. The blade assumes a forward orientation while it is being used as a shovel or a pusher, and assumes a backward orientation while it is being used as a scraper. The raised side edges of the blade create a barrier for the snow as it is being moved, thereby alleviating the spreading out problem that occurs with conventional scrapers. Additional handle extensions can be attached to the existing handle to accommodate different sized roofs and users.

BRIEF DESCRIPTION OF THE DRAWINGS

FIG. 1A is an isometric view of the snow removal tool of the invention configured for use as a roof scraper with the blade in an intermediate position with directional arrows indicating potential movement of the blade in either direction for easy interconvertability.

FIG. 2 is a perspective view of the blade of the snow removal tool of the invention.

FIG. 3 is a side elevation of the blade of the snow removal tool of the invention.

FIG. 3A is a side elevation of an alternative embodiment of the blade of the snow removal tool of the invention.

FIG. 4 is a plan view of the upper face of the blade of the snow removal tool of the invention.

FIG. 4A is a plan view of the top of the blade of the snow removal tool of the invention, and shows the connection between the handle and the blade of the invention.

FIG. 5 is a front or transverse elevation of the blade of the snow removal tool of the invention.

FIG. 6 is a longitudinal elevation or side view of the angle support which connects to and reinforces the blade of the invention.

FIG. 6A is an end view of the angle support which connects to and reinforces the blade of the snow removal tool of the invention.

FIG. 7 is a top view of one of the side supports which comprise the handle extensions which attach to the blade of the snow removal tool of the invention.

FIG. 8 is a plan view of the original elongated handle of the snow removal tool of the invention.

FIG. 8A is a side elevation of the handle extensions which connect to the elongated handle of the snow removal tool of the invention.

FIG. 10 is an isometric view of the invention as it is being used as a pusher, the blade of the invention assuming a somewhat horizontal position as it is being pulled toward the user.

FIG. 10A is an isometric view of the invention as it is being used as a pusher, the blade of the invention assuming a somewhat vertical position as it is being pushed away from the user.

FIG. 11A is an alternative embodiment of the invention as it is being used as a shovel, the blade of the invention being secured at an angle with the handle of the invention.

FIG. 12 is a side elevation of an alternative embodiment of the blade of the snow removal tool of the invention showing a rounded front edge of the side extensions.

FIG. 13 is a side elevation of an alternative embodiment of the blade of the snow removal tool of the invention showing an upwardly curved front edge of the blade.

FIG. 14 is an isometric view of an alternative embodiment of the blade of the snow removal tool of the invention showing protective tabs attached to the front edge of the blade of the invention.

FIG. 15 is a side view of a protective strip which would attach to the blade of the snow removal tool of the invention.

FIG. 15A is a side view of the side extension of the blade of the invention showing the attachment of the protective strip to the angle support and the front edge of the blade of the invention.

DETAILED DESCRIPTION OF THE PREFERRED EMBODIMENTS SHOWN IN THE DRAWINGS

The present invention provides a snow removal or handling device which is especially adapted for use in removing excessive snow from rooftops to prevent structural damage to such roof, or even collapse, and which is also adaptable for removal of snow from the ground and the like. The device of the invention, because of its construction, is easy and economical to manufacture and strong and durable in use. Its simple construction makes it easily and conveniently convertible from one use to another.

The snow removal device is formed of a handle, which can be extended when necessary, and a pivoted combined scoop and pusher blade having raised side portions attached to the handle by a bracket. The raised side portions provide attachment and adjustment orifices by which the blade is adjustably attached to the handle and locked in various operating positions, while also preventing snow from sliding sideways from the blade.

The following detailed description is of the best mode or modes of the invention presently contemplated. Such description is not intended to be understood in a limiting sense, but to be an example of the invention presented solely for illustration thereof, and by which reference to the following description and the accompanying drawings one skilled in the art may be advised of the advantages and construction of the invention.

Figure 9:
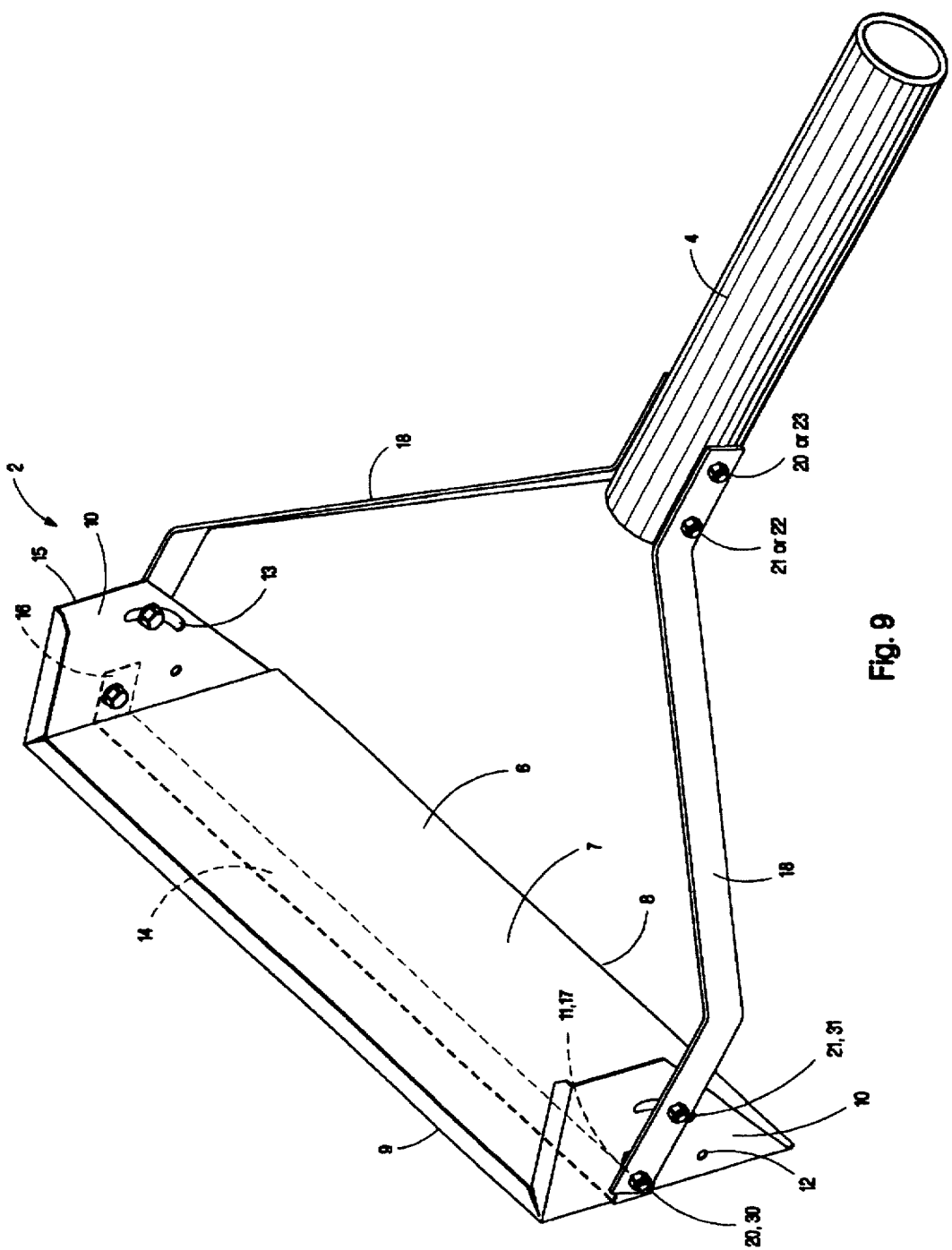
FIG. 9 is an isometric view of the invention as it is being used as a scraper, the blade of the invention assuming a somewhat angled position as it is being pushed away from the user.
Figure 9A:
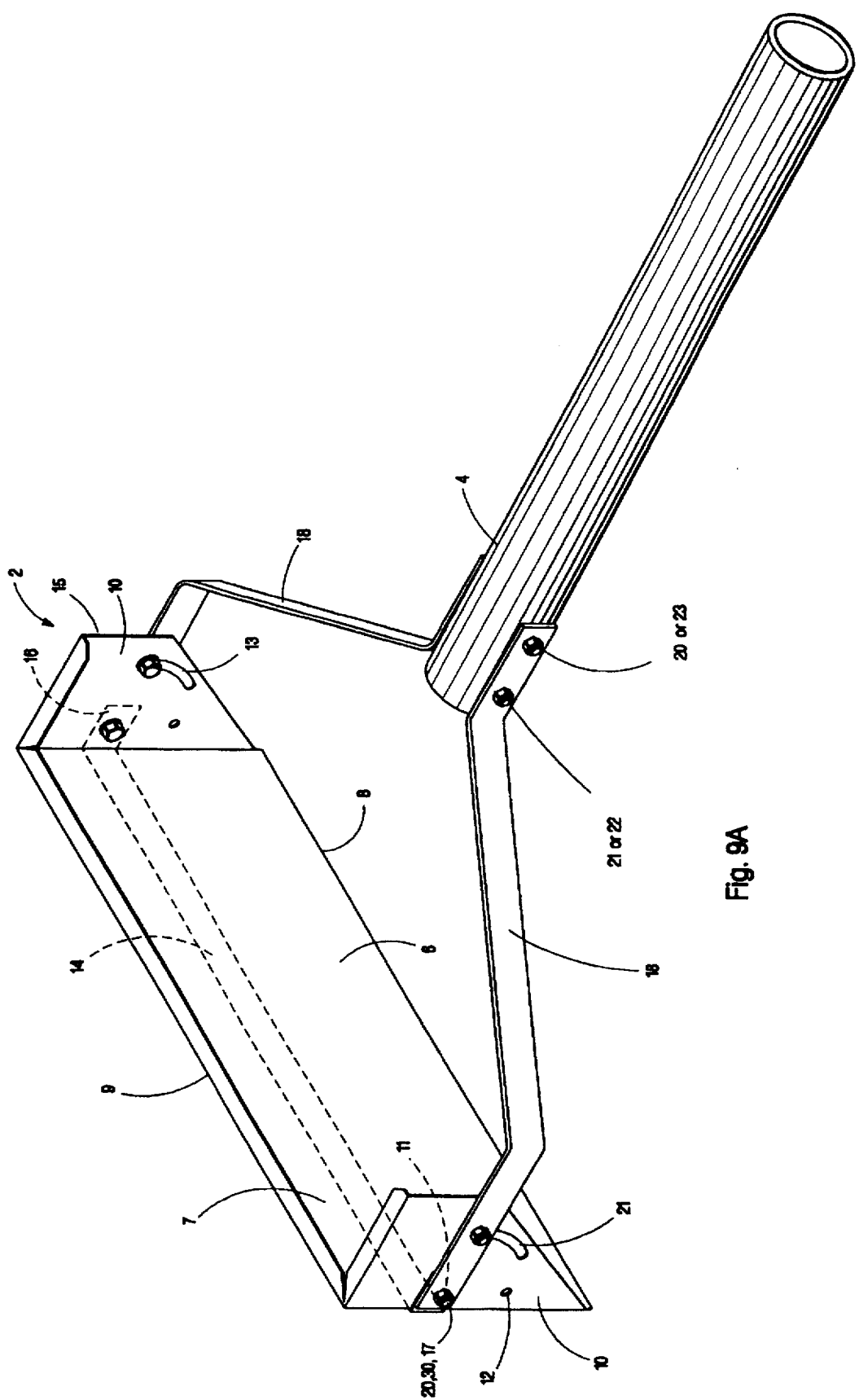
FIG. 9A is an isometric view of the invention as it is being used as a scraper, the blade of the invention assuming a vertical position as it is being pulled toward the user.

FIG. 1A is an isometric view of the snow removal device 1 of the invention configured for its roof scraper mode of operation and shown, for convenience and illustrative purposes, with an intermediate position of its adjustable blade 2 with directional arrows 3 indicating directions of adjustment of the blade from the configuration shown, in which 4 is the handle, and 5 is or are broadly the attachment means for adjustably securing the blade to the handle. Curved open orifice or channel 13 allows adjustment normally between positions. The blade 2 in FIG. 1A can be adjusted with respect to the handle to convert the snow removal device from a roof scraper mode, in which snow is pulled down the slope of a roof by the handle 4, plus in many cases an extension, not shown, which is grasped by a user typically standing on the ground, to a position of the blade in which the snow removal device is pushed or slid up the roof over the snow prior to being pulled back with the snow. The two opposite positions of the blade 2 in the scraper mode or configuration shown in FIG. 1A are as shown in FIGS. 9 and 9A, and more particularly described hereinafter in connection with such views.

Figure 1B:
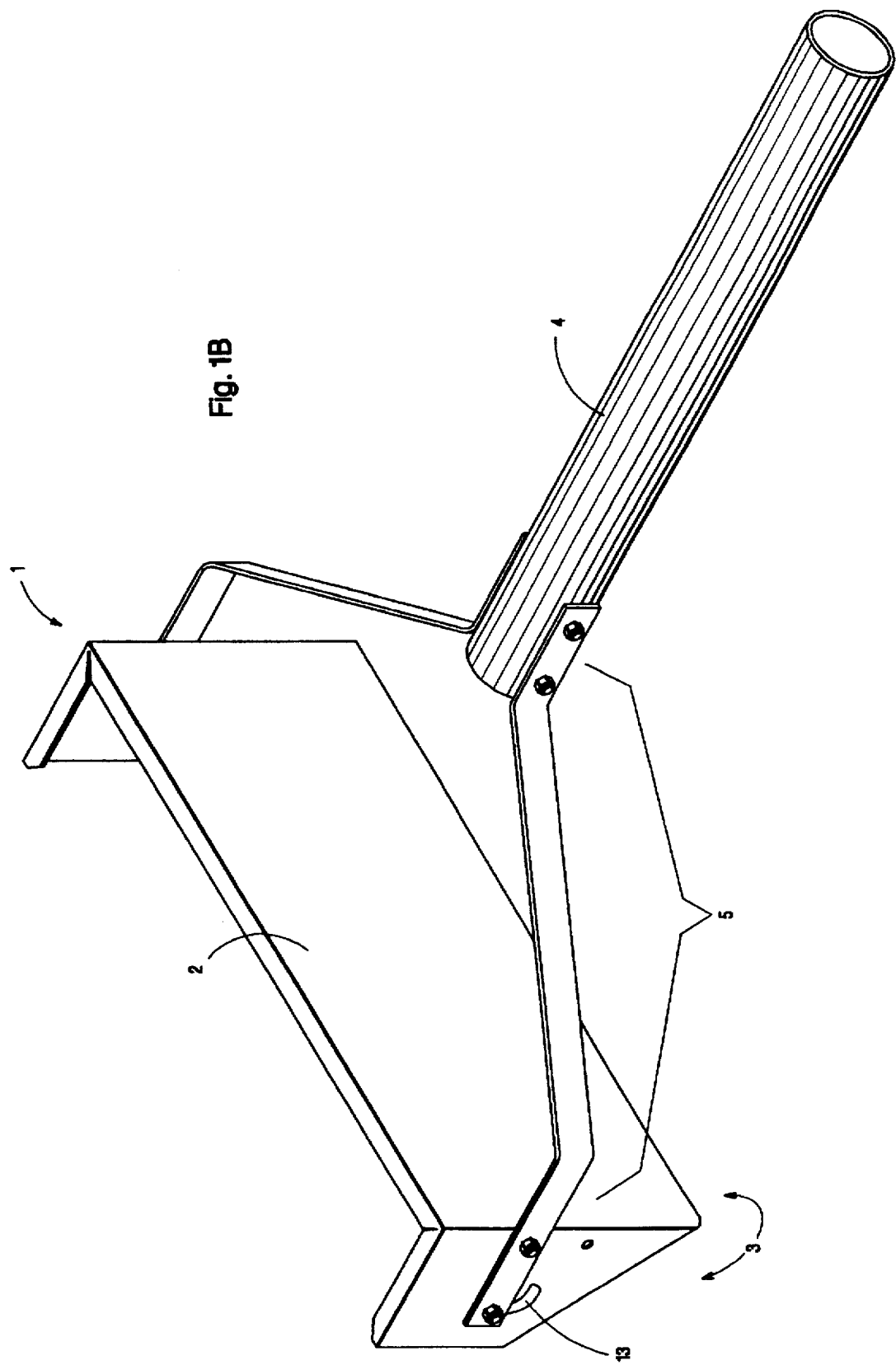
FIG. 1B is an isometric view of the snow removal device of the invention configured for use as a pusher type apparatus again with directional arrows indicating easy interconvertability.

FIG. 1B is a second isometric view of the snow removal device 1 of the invention with the adjustable blade 2 arranged or mounted on the handle 4 in a configuration for removal of snow from a roof in a pusher mode in which figure the blade 2 is again shown in intermediate position, with directional arrows 3 indicating the direction of movement of such blade into actual pusher position of the blade 2 and return position of the blade 2, more particularly shown in FIG. 10 and 10A respectively and more particularly described in connection with such figures hereinafter. It may be noted that the blade 2 of the invention has been merely reversed with respect to the handle 4 as between the scraper configuration shown in FIGS. 1A, 9 and 9A and the pusher configuration shown in FIGS. 1B, 10 and 10A. The scraper configuration and pusher configuration are two of the main or principal configurations of the snow removal device of the invention, the other being the shovel configuration shown more particularly in FIGS. 11 and 11A and more particularly described in connection therewith hereinafter. The details of the snow removal device or apparatus of the invention will now be described.

FIG. 2 is an isometric view of the blade 2 of the snow removal device 1 of the invention showing that such blade 2 is comprised of a planar generally rectangular section 6 having a top surface 7 with a front edge 8, a back edge 9, and side extensions 10 extending substantially vertically away from the blade surface 7, each side extension 10 incorporating a first orifice 11, a second orifice 12, and an arcuate opening or channel 13. The first orifice 11 is located closer to the back edge 9 of the blade 2, the second orifice 12 is located closer to the front edge 8 of the blade 2, and the arcuate opening or channel 13 is situated between the first orifice 11 and the second orifice 12. An angle support 14, partially or mostly shown in phantom and described more particularly in connection with FIG. 6, extends under and braces the blade 2 and particularly the planar rectangular section 6 of blade 2.

FIG. 3 is a side elevation of the left side extension 10 of the blade 2 with the first orifice 11 located closer to the back edge 9 of the blade 2, the second orifice 12 located closer to the front edge 8 of the blade 2, and the arcuate opening or channel 13, horizontally positioned between but upwardly displaced from the first orifice 11 and the second orifice 12. The lowest portion of the edge of the arcuate opening or channel 13 is located substantially vertically above the second orifice 12 of the side extension 10, while the uppermost edge of the arcuate opening or channel 13 is located substantially vertically above the first orifice 11 of the side extension 10. The center of curvature of the arcuate opening or channel 13 is centered in the first orifice 11, tracing approximately a 60° arc counterclockwise from an imaginary line extending vertically upwardly from the first orifice 11.

FIG. 3A is an alternative embodiment of a left side extension 10 of the blade 2, wherein the top surface 15 of the side extension 10 is curved, with the greatest curvature toward the back edge 9 of the blade 2, and the smallest curvature extending more gradually toward the front edge 8 of the blade 2. The curvature of the top surface 15 traces in a general manner the curvature of the arcuate opening or channel 13.

FIG. 4 is a view of the blade 2 looking down onto the top surface 7 of the blade 2 from above. The back edge 9 of the blade 2 can be seen at the upper edge of the figure, while the front edge 8 of the blade surface 7 can be seen at the lower edge of the view. The rectangular configuration of the top of the blade 2 can be seen in this view. It is important that the blade section 6 be rectangular at least on the two ends so that proper operation of the device can be attained. However, it would be possible, with some loss of effectiveness, for the central portion of the blade within the confines of the first and second orifices 11 and 12 and arcuate opening or channel 13 to be extended somewhat to the side.

FIG. 4A shows a top or plan view of the blade 2 with connections to the attachment means 5 (see FIGS. 1A and 1B) described more particularly hereinafter in connection with FIG. 7. The attachment means 5 (see FIGS. 1A and 1B), here showed with reference to reference numeral 18 which is discussed in detail in FIG. 7, form a zig-zag shape, connecting the handle 4 with the side extensions 10.

FIG. 5 is a frontal view of the blade 2 with the side extensions 10 extending upwardly from the blade surface 7.

FIG. 6 is a side view of the angle support 14 which comprises an open C-shaped conventional angle support 14 intended to span the longitudinal axis or transverse dimension of the planar rectangular section 6 of the blade 2, plus the side extensions 10 on each edge of the blade 2. The angle support 14 has raised ends 16 on each side with orifices 17 in the raised edges 16 for attachment in either the first orifice 11 or second orifice 12 or, if desired, in a further special orifice, not shown. The angle support 14 is intended to brace the blade 2 by extending along the bottom of the planar rectangular section 6 of the blade 2, with the angle side orifice 17 mating with either the first orifice 11 or second orifice 12 of the side extensions 10 of the blade 2 as indicated upon the configuration of the blade 2. The attachment means 5, shown and described more particularly in FIG. 7, are connected to the blade 2 through the side orifices 17 in the raised edges 16 of the angle support 14 and then through the first orifice 11 or second orifice 12 of the side extensions 10 of the blade 2. FIG. 6A is a side or end view of the angle support 14 with one of the orifices 17 for attaching to the side extension 10 of the blade 2.

FIG. 7 is a top view of one portion of the attachment means 5 shown in previous figures, comprising one of two angled bracket members 18 of the bracket 5 forming side supports which connect the blade 2 with the handle 4. As can be seen in previous FIG. 4A the two side supports or brackets 18 serve to connect the handle 4 to the blade 2 through suitable fastenings. Each side support or angled bracket member 18 is comprised of a zig-zag shaped bar with parallel end sections 19 with a set of first orifices 20 located on the outer parallel sections 19 of the bar and a second set of orifices 21 disposed farther inward from the first orifices 20 on an inward portion of the bar as it appears in the attachment means 5. The first orifice 20 and the second orifice 21 are intended to mate with either the first or second orifices 11 or 12 of the side extensions 10 and the arcuate opening or channel 13 therein, or alternatively the first orifice 11 and the second orifice 12 of the side extensions 10 in a different configuration of the device. The opposite first and second orifices 22 and 23 are intended to affix the side support members 18 to the handle 4. The two ends of the side support members 18 are interchangeable and symmetric. Consequently, the orifices which serve to affix the handle 4 to the bracket 5 could also affix the bracket 5 to the side extensions 10 of the blade 2 and vice versa. The ends of the side support or angled bracket members 18 which affix to the handle 4 are generally intended to be permanently fastened thereto, while most of the alternative attachments that accommodate changing configurations of the snow removal device take place at the side support sections 19 which connect to the blade 2.

FIG. 8 is the handle 4 which attaches to the blade 2 via the two side supports 18. The handle 4 incorporates a first orifice 24 and a second orifice 25 on one end, and an orifice 26 on the opposite end. The handle 4 is fastenably connected to the two side supports 18 through the first orifice 24 and the second orifice 25 on the handle 4 and further through the first orifice 22 and the second orifice 23 of the side supports 18.

FIG. 8A shows a handle extension 27 or pole which connects to, and elongates the original handle 4 for higher roofs or longer roof surfaces. The handle extension 27 incorporates an orifice 28 on one end and a spring bolt 29 on the opposite end, such spring bolt 29 being intended to initially fastenably mate with orifice 26 from the original handle 4 in an interlocking fashion. An orifice 28 from one handle extension 27 is intended to fastenably mate with a spring bolt 29 from another handle extension 27 in an interlocking fashion, thereby creating a further elongated handle in series with the original handle 4. Any suitable encircling or sliding means, not shown, to prevent two pieces from separating may be used.

FIG. 9 depicts an embodiment of this invention as it is being used as a roof snow scraper. The angled brackets or side supports 18 are connected to the blade 2 so that the side extensions 10 of the blade 2 are positioned closer to the handle 4 than the planar rectangular portion 6 of the blade 2. A set of first screw fastening or bolts 30 rotatably connect the side extensions 10 to the blade 2 and the angle support 14 through the first orifices 20 in the side supports 18, the orifices 17 in the angle support 14, and finally through the first orifices 11 in the side extensions 10. Rotational movement of the blade 2 with respect to the handle 4 occurs about the bolts 30. A set of second bolts 31 connects the side supports 18 to the blade 2 through the arcuate opening or channels 13. Each second bolt 31 slides within each arcuate opening or channel 13 as the entire blade 2 pivots on the side supports 18 by way of the bolts 30. The blade 2 pivots to an angled position so that the front edge 8 of the blade 2, as well as the underside of the planar rectangular surface 6, slides across the snow as the device is being pushed up the roof as shown in FIG. 9 in preparation for snow removal, which snow removal occurs when the device is being pulled down the roof through the snow.

FIG. 9A depicts the roof snow scraper configuration as the device is being pulled down a snow-covered roof, with the blade 2 fully pivoted to a vertical position from a somewhat angled position which the blade assumes as the device is pushed up the roof and over the top of the snow as shown in FIG. 9. The front edge 8 of the blade 2 digs downward into the snow along the roof to facilitate snow removal, while the side extensions 10 provide an enclosed environment for the scraping stroke, thus preventing the potential for spreading of either the removal device or the snow pack as might occur if there were no side extensions 10. After the user has completed the downward stroke of the device, the device is again pushed up the roof after automatically assuming the position depicted in FIG. 9, in preparation for the next downward stroke.

FIG. 10 is an embodiment of the invention as it is being used as a pusher or a plow. This mode of use would be implemented for snow removal either on the ground, or more frequently from a rooftop while the user is actually standing on the roof and desires to push the snow off of the side of such roof. The side supports 18 are connected to the blade 2 so that the back or under surface of the blade 2 is located closer to the handle 4 than the side extensions 10. A set of first bolts 30 slidably connects the side supports 18 to the blade 2 through the first orifices 20 in the side supports 18 and the arcuate openings or channels 13 in the side extensions 10 of the blade 2. A set of second bolts 31 rotatably connects the side supports 18 to the blade 2 through the second orifices 21 in the side supports 18 through the orifice 17 of the angle support 14, and first orifices 11 in the side extensions 10. Rotational movement occurs about the second bolts 31. Each first bolt 30 slides within each arcuate opening or channel 13 as the entire blade 2 pivots on the side supports 18 by way of the bolts 31. The blade 2 pivots to an angled position so that the front edge 8 of the blade 2, as well as the underside of the planar rectangular section 6 slides across the snow as the device is being pulled toward the user in preparation for snow removal, which occurs when the device is being pushed forwardly through the snow to push the snow off the roof or occasionally along the ground. However, since there is somewhere for the snow to go in the case of a roof, i.e. off the edge of the roof, this mode of operation is most efficient on a roof.

FIG. 10A depicts the pusher, or plow, device as it is being pushed through snow in a forward direction usually on a roof, but also on the ground, with the blade 2 fully pivoted to a vertical position from a somewhat angled position which the blade assumes as the device is being pulled toward the user allowing it to move without binding with the underlying surface. The planar top surface 7, in combination with the front edge 8 and side extensions 10 of the blade 2, provide the pushing surface with which to force compressional removal of snow accumulations. Again, the side extensions 10 provide a partially enclosed environment for effecting snow removal which diminishes sideways spreading of the snow from the blade which would otherwise occur if there were no side extensions 10. After the user has completed the forward pushing stroke, the device is again pulled toward the user, assuming the position depicted in FIG. 10, in preparation for the next forward stroke.

Figure 11:
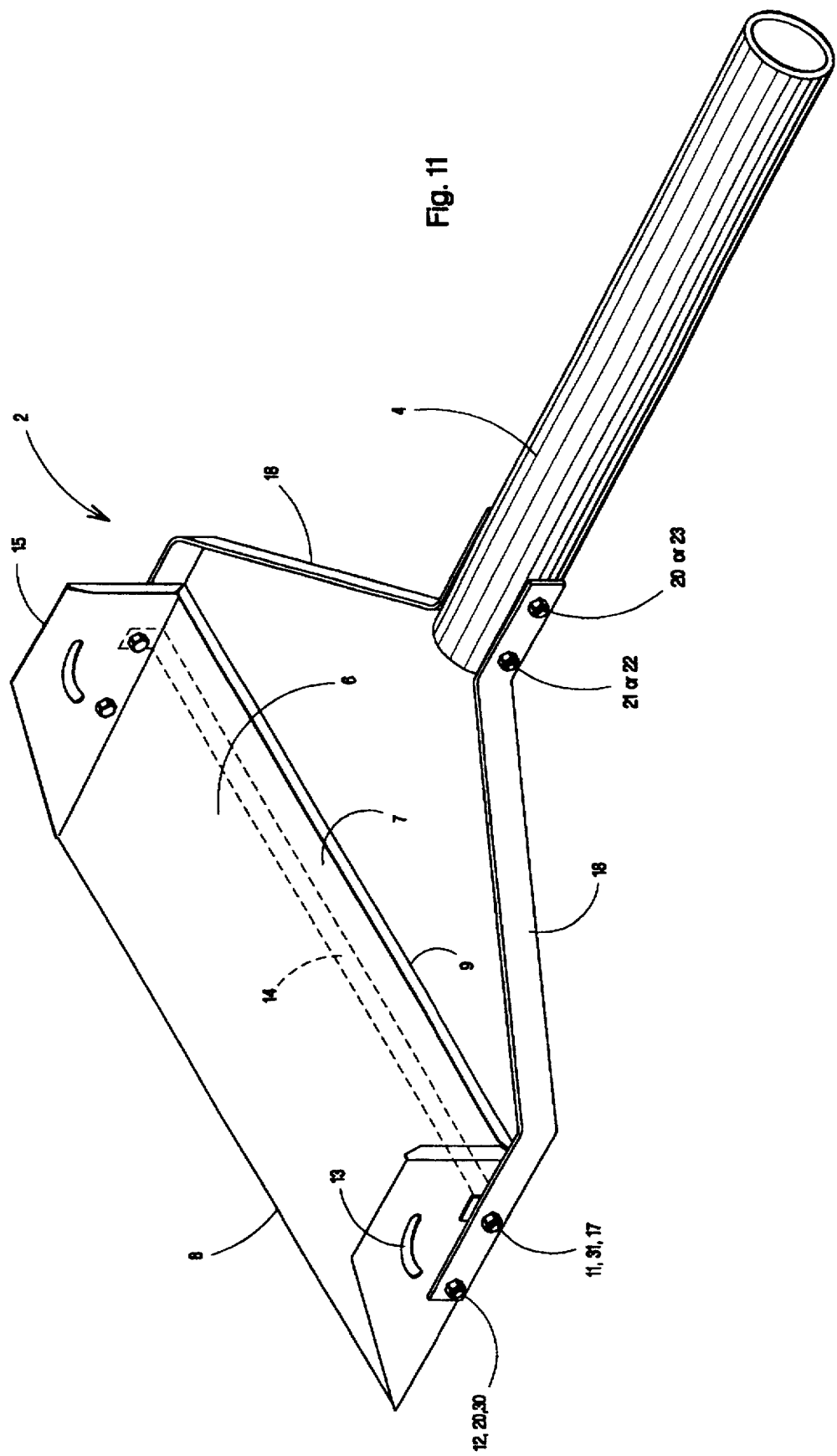
FIG. 11 is an isometric view of the invention as it is being used as one type of shovel, the blade of the invention being longitudinally aligned with the handle of the invention.

FIG. 11 depicts an embodiment of the invention configured for use as a conventional shovel. Such configuration may be implemented for snow removal either on the ground, or from a rooftop while the user is actually standing on the roof and desires to lift the snow off of the roof should the roof have raised edges or some other type of obstruction to pushing. The side supports 18 are fixedly rather that rotatably connected to the blade 2 so that the back edge 9 of the blade 2 is located closer to the handle 4. A set of first bolts 30 fixedly connects the side supports 18 to the blade 2 through the first orifices 20 in the side supports 18 as well as through the second orifices 12 in the side extensions 10. A set of second bolts 31 fixedly connects the side supports 18 to the blade 2 through the second orifices 21 in the side supports 18, through the orifice 17 in the angle support 14, and first orifices 11 in the side extensions 10. There is no connection through the arcuate opening or channel 13 because the blade 2 in this embodiment does not pivot, and therefore, there is no bolt which slides within the arcuate opening or channel 13 in response to a pivoting motion of the blade. This embodiment therefore would be used like any other conventional shovel, where the snow is scooped out and away in a methodical manner, clearing a predetermined pathway.

FIG. 11A depicts an alternative embodiment of the blade 2, as it is being used as a conventional shovel, with the handle fixed in a slightly raised position with respect to the blade 2. The side supports 18 are fixedly connected to the blade 2 so that the back edge 9 of the blade 2 is located closer to the handle 4. A set of first bolts 30 fixedly connects the side supports 18 to the blade 2 through the first orifices 20 in the side supports 18, through the orifice 17 in the angle support 14, and through the second orifices 12 in the side extensions 10. A set of second bolts 31 fixedly connects the side supports 18 to the blade 2 through the second orifices 21 in the side supports 18 and the arcuate opening or channel 13 in the side extensions 10. The handle displacement should approximate 30° from the horizontal axis of the blade 2. This embodiment would provide a little more leverage with respect to a scooping action, and doesn't require as much bending on the part of the user. Since the bracket means 5, or more particularly the side supports 18, are connected to the side extensions 10 through the second orifice 12 and the arcuate opening or channel 13, and since orifice 12 is spatially offset from the concentric center of the arcuate opening or channel 13, which concentric center is defined by the first orifice 11, the bolts 31 are effectively fixed in the upper end of the arcuate opening or channel 13 and cannot slide along such channel 13. Consequently, the handle 4 is effectively stabilized upon the side extensions 10 at the angle shown.

FIG. 12 depicts an alternative embodiment of the blade 2, where the front edge 8 as well as the forward portion of the side extensions 10 of the blade 2 are rounded so that there is no sharp point at the meeting of the front edge 8, the planar surface 7, and each side extension 10. Apart from being a safety measure for the user, this rounded front edge 8 prevents the possible damage to the roof surface that a sharp edge might cause. A sharp front edge 8 may tend to de-surface some of the roof, and may also possibly result in the removal of loose or weakly secured shingles.

FIG. 13 depicts a further alternative embodiment of the blade 2, where the front edge 8 of the blade 2 of the invention is extended and upwardly rounded so that the front edge surface 8 is no longer sharp. As with the embodiment shown in FIG. 12, this rounded front edge 8 prevents the possible damage to the roof surface that a sharp edge could cause. This arrangement, however, may lessen the desired effect when the device is being used as a pusher or a conventional shovel. A curved surface would tend to ride over the snow as it is being shoveled.

FIG. 14 depicts an alternative embodiment of the blade 2 of the invention showing protective tabs 32 attached to the front edge 8 of the blade 2 of the invention. These tabs may be used as an additional protective and preventative measure when considering the integrity of the roof during the operating of the device. However, the present inventor has realized that a thin layer of ice is usually present on the roof after the snow has been scraped off, which usually serves to protect the surface of the roof from the scraping action. The protective tabs 32 may either clip on to the front edge 8 of the blade 2, or they can be resiliently formed so that they grip and adhere to the front edge 8 of the blade 2.

FIG. 15 and FIG. 15A depict a protective strip 50 which comprises a back hooking end 51 and a front hooking end 52. The flexible protective strip 50 is affixed to the blade of the invention 2 by hooking the back hooking end 51 of the protective strip 50 to the angle support 14, and then by hooking the front hooking end 52 of the protective strip 50 to the front edge 8 of the blade of the invention 2. The front hooking end 52 would merely "clip" onto the front edge 8 of the blade of the invention 2, and the flexible tension of the attachment between the front edge 8 and the angle support 14 should prevent the protective strip 50 from separating from the blade of the invention 2. This protective strip 50 serves a similar function as the protective tabs 32 seen in FIG. 14.

GENERAL DESCRIPTION OF THE PREFERRED EMBODIMENTS

The ability for the blade 2 of the device to pivot in accordance with the direction of the stroke, between a somewhat angled position, preferably approximately 30° counter-clockwise from the top surface 7 of the blade 2 or from a longitudinal plane through the side support members 18, and a basically vertical position (perpendicular or 90° to the longitudinal plane through the side supports 18), is crucial to the design and operability of the snow removal device. Such pivotability, with an approximate 60° range of motion, avoids the required lifting of the entire device that would otherwise be necessary during initial blade positioning, and each successive repositioning necessary prior to each subsequent snow removal stroke. When the device is being used as a roof snow scraper, the user has merely to place the blade at the edge of the roof and slide it over the snow to the top of the roof. If the blade were not able to pivot and then slidably move over the snow, the user would have to lift the entire device to the top of the roof each and every time the user contemplated a downward stroke.

The same problem would occur when the device is being used as a pusher. After the forward pushing stroke, the blade pivots at the beginning of the backstroke so that the user merely has to drag the device backward, either over another layer of snow or along cleared ground or roof section. Without this pivotability, the user would have to lift, draw the entire device backward, and place it on the ground or a roof to begin again. The pivotability allows for a fluid back and forth motion, without any perpendicular interruption in the basic plane of motion. Without the pivotability, the device would have to be constantly be picked up and placed down, which would become extremely tiring and burdensome to an already disgruntled user.

The blade 2 is preferably constructed out of galvanized steel which provides strength, durability and rust-resistance. However, a durable polymeric or plastic material would also be satisfactory. It is important, should a metal be used in the production of the parts, that such metal be corrosion resistant, for example, galvanized, due to the nature of the device which will consistently be exposed to water and dampness. Corrosion resistance is especially important for all of the connecting components, since rust tends to form first in crevices and at junctions of different parts. The same type of galvanized material would be preferred for the angle support 14 and the side supports 18 for the same previously mentioned reasons. Other corrosion resistant materials such as aluminum, anodized aluminum coated steel, stainless steel and the like could also be used depending upon cost and availability. The front edge 8 of the blade 2 will be preferably slightly rounded so as to maximize its efficiency as a scraper, pusher and/or shovel. Too much curvature would decrease its effectiveness as a pusher, however, and possibly as a shovel. It is also preferable that the side extension walls 10 incorporate straight edge cuts, as shown in FIG. 3, however, curved edges as illustrated in FIG. 3A may be more aesthetically pleasing and while adding to the cost of manufacturing, should not affect the functional use of the device.

The bolts 30 and 31 preferably utilize retaining wingnuts in order to facilitate change from one operating mode to another which requires various configurational changes. Wingnuts are fairly easy to manipulate, even when they are cold and slippery. Snow interferes only minimally with the operation of the wingnuts, since snow is usually merely compacted around the wingnuts during movement past the wingnuts. Locknuts would also work, however, they tend to be more difficult to turn when cold and slippery. Locknuts would, however, be preferred if the device were being used continually in the same configuration, e.g., as a roof snow scraper for the duration of a season.

While the blade may assume three different positions depending on whether the device is going to be used as a scraper, pusher or shovel, the handle assembly remains a constant. The side supports 18 which receive the blade 2 must first be connected to the handle 4, which is preferably four to six feet long, before the blade 2 can be connected to the side supports 18. The first side support 18 should be connected to the handle 4 so that the orifice 24 of the handle 4 is aligned with the first orifice 20 of the side support 18, while the orifice 25 of the handle 4 is aligned with the second orifice 21 of the side support 18. The second side support 18 should be connected to the opposite side of the handle 4 using the same orifice configurations so that the combination of side supports 18 and handle 4 assume a "Y" configuration when the handle 4 is held vertically upright. This combination of side supports 18 and connecting bolts forms the bracket means 5 originally referred to in FIGS. 1A and 1B. The "Y" configuration is assumed as a result of connecting the side supports 18 in a diametrically opposed symmetrical fashion on either side of the longitudinal axis of the handle 4. Extension poles or handles 27, preferably four to six feet in length, are then added to the bottom of the handle 4 by fastenably mating the orifice 26 in the handle 4 with the spring bolt 29 of the extension pole 27. Additional extension poles 27 are then added to the overall desired length by fastenably mating each spring bolt 29 with each orifice 28 on each extension pole 27. As indicated above, the spring bolts 29 may be aided in holding the extension poles 27 together by a suitable securing band or sleeve over the intersection of the poles 27. The number of added extension poles 27 should be commensurate with the height of the building from the roof of which snow is to be removed.

The first of three possible configurations of the blade 2 of the device of the invention is that of a roof snow scraper. As depicted in FIGS. 1A, 9 and 9A, the blade 2 is attached to the side supports 18 of the handle 4 so that the front edge 8 of the blade 2 is facing both the handle and the user when the device is held horizontally outward in front of the user. The first orifice 20 of the side support 18 is aligned with the orifice 17 of the angle support 14 and the orifice 11 of the side extension 10, and a bolt 30 is used to rotatably connect the side support 18 to the side extension 10 through the angle support 14. The same procedure is used on the other side of the blade 2 to secure or attach the side support 18 on that side. The second orifice 21 of the side support 18 is then aligned with the arcuate opening or channel 13 of the side extension 10, and a bolt 31 is used to slidably connect the side support 18 to the side extension 10. Again, the same procedure is used on the other side of the blade 2 to connect the other side support 18 through the arcuate opening or channel 13. The blade 2 is thereby allowed to rotatably pivot on the bolt 30 so that the bolt 31 can traverse the length of the arcuate opening or channel 13.

When the snow removal device is initially placed at the bottom of a snow-covered roof and is resting on top of the snow, the blade 2 should be fully pivoted so that the bolt 31 is resting on the lower end of the arcuate opening or channel 13, which is approximately 60° from a vertical defining the other end of the arcuate opening or channel 13. The user pushes the blade 2 forward up the roof along the snow, such that the front edge 8 of the planar rectangular section 6 of the blade 2 contacts and slides along the snow until it reaches the top of the roof. When the blade 2 is at the top of the roof, the user then begins to draw the device down the roof. The change in direction causes the blade 2 to pivot to a fully vertical position, whereby the bolt 31 is now resting at the opposite end of the arcuate opening or channel 13 and the front edge 8 of the planar rectangular section 6 is now digging into the snow accumulation on the roof. As the device is drawn down the roof, the snow, bounded by the planar rectangular section 6 and the two side extensions 10 of the blade 2 is drawn down and finally off the roof when the device reaches the bottom edge of the roof. This motion forces a section of snow off the roof generally either somewhat more than the accumulation of the snow up to as much as the height of the planar rectangular section 6. Without lifting the device, the user may then slide the blade 2 up the roof, the blade 2 pivoting to slide over any remaining snow, and the process repeats itself. As the snow cover becomes thinner, the user should ease up on the downward pressure exerted on the handle 4 so as not to damage the actual roof itself. It is not necessary that the roof be scraped dry, because a light coating of snow should not create the potential hazardous condition prevalent with a thick, heavy layer. When the user ultimately clears the snow from each section of the roof, the blade 2 can be slid laterally across the roof to each new snow-covered section, again without having to lift the device from the roof.

The user should not have to exert too much downward pressure during the scraping action, unless the snow is iced over, in which case the blade may have to be lifted and brought down on the snow to loosen or penetrate the top surface. If the snow is difficult to break or move, the bolt 31 should probably be fastened with the blade 2 in a vertical position so that the blade 2 can be used to chop into the iced over material. A sharp front edge 8 would accommodate this procedure. However, a slightly rounded front edge 8 should be sufficient as well. Once the snow has been freed, the bolt 31 should then be loosened so that it is once again capable of sliding within the arcuate opening or channel 13.

The second of three possible configurations of the blade 2 of the device of the invention is use as a pusher or plow. As depicted in FIGS. 10 and 10A, the blade 2 is attached to the side supports 18 of the handle 4 so that the front edge 8 of the blade 2 is facing away from both the handle and the user when the device is held horizontally outward in front of the user. The second orifice 21 of the side support 18 is aligned with the orifice 17 of the angle support 14 and the orifice 11 of the side extension 10, and a bolt 31 is used to rotatably connect the side support 18 to the side extension 10 through the angle support 14. The same procedure is used on the other side of the blade 2. The first orifice 20 of the side support 18 is then aligned with the arcuate opening or channel 13 of the side extension 10, and a bolt 30 is used to slidably connect the side support 18 to the side extension 10. Again, the same procedure is used on the other side of the blade 2 to connect the other side support 18. The blade 2 is thereby allowed to rotatably pivot on the bolt 31 so that the bolt 30 can traverse the length of the arcuate opening or channel 13.

For use of the device of the invention as a snow pusher, the user should gain access to the top of the roof and station himself or herself at the apex of the roof, straddling the top if the roof is slanted. The extension poles 27 can usually be put aside during this procedure, since the user is much closer to the roof from which the snow is being cleared. The device may be initially placed at the bottom of the snow-covered roof so it is resting on top of the snow, with the blade 2 fully pivoted so that the bolt 30 is resting on the lower end of the arcuate opening or channel 13, which is approximately 60° from a vertical defining the other end of the arcuate opening or channel 13. The user draws the blade 2 back up the roof along the snow, whereby the front edge 8 of the planar rectangular section 6 of the blade 2 contacts and slides along the snow until it reaches the top of the roof. When the blade 2 is at the top of the roof, the user then begins to push the device down the roof. The change in direction causes the blade 2 to pivot to a fully vertical position, whereby the bolt 30 is now resting at the opposite end of the arcuate opening or channel 13 and the front edge 8 of the planar rectangular section 6 is now digging into the snow. As the device is pushed down the roof, the snow, bounded by the planar rectangular section 6 and the two side extensions 10, is driven down and off the roof when the device reaches the bottom edge of the roof. Without lifting the device, the user then draws the blade 2 up the roof, the blade 2 pivoting to slide over any remaining snow, and the process repeats itself. As the snow cover gets thinner, the user should ease up on the downward pressure exerted on the handle 4 so as not to damage the actual roof itself. As with the scraping action, it is not necessary that the roof be scraped dry, because a light coating of snow should not create the potential hazardous condition prevalent with a thick, heavy snow layer. When the user ultimately clears the snow from one section of the roof, the blade 2 can be slid laterally across the roof to each new snow-covered section, again without having to lift the device from the roof.

The above described pushing action may also be used to clear snow from the ground, with an action similar to a snowplow. Again, as when the user is straddling the roof, the extension poles or handle extensions 27 can be put aside. The same sliding motion as used on a roof is used to clear snow from the ground with a pushing action, without really having to lift the device from the ground. This type of push operation should probably only be used with a relatively light ground snow cover, since heavier snows require vertical displacement as well as horizontal displacement, i.e. the snow must be lifted as well as moved. The ability to push a light snow out of the way over a short distance such as off the side of a pavement would be favorable to people with back problems and for those who can not easily bend at the waist. The only exertion required in light snow for push type snow removal is the back and forth motion with an arm.

The third of three possible configurations of the blade 2 of the device of the invention is configuration as a conventional shovel. As depicted in FIG. 11, for use as a shovel the blade 2 is attached to the side supports 18 of the handle 4 so that the front edge 8 of the blade 2 is facing away from both the handle and the user when the device is held horizontally outward in front of the user. The second orifice 21 of the side support 18 is aligned with orifice 11 of the side extension 10, and a bolt 31 is used to fixedly connect the side support 18 to the side extension 10 through the orifice 17 of the angle support 14. The same procedure is used on the other side of the blade 2. The first orifice 20 of the side support 18 is then aligned with the second orifice 12 of the side extension 10, and a bolt 30 is used to fixedly connect the side support 18 to the side extension 10. Again, the same procedure is used on the other side of the blade 2 to connect the other side support 18. The blade 2 is thereby fixed in a horizontally aligned position with the side supports 18 and the handle 4. With the blade 2 aligned with the side supports 18 and the handle 4, the blade will best be used in this embodiment during a light snow which requires little effort, or when pushing forward in a forward scraping fashion. This configuration does not lend itself very well to removing deep sections of snow due to the lack of curvature of the blade 2 or angle of the blade with respect to the handle 4. It will be recognized that FIG. 11A depicts a more favorable configuration if the snow removal device is to be used as a shovel as described below.

17

FIG. 11A illustrates a configuration of the device when used as a shovel where the blade 2 is not horizontally aligned with the side supports 18 and handle 4, but is instead slightly angularly aligned with respect to the side supports 18 and the handle 4. The only difference between this embodiment and the previously described embodiment is that bolt 30 now fixedly connects the side supports 18 to the side extensions 10 via the orifices 20 in the side support 18 and the orifice 17 in the angle support 14. Bolt 31 now fixedly connects the side supports 18 to the side extensions 10 via the orifices 21 in the side supports 18 and the arcuate opening or channel 13. bolt 31 resting at the end of the arcuate opening or channel 13 directly above the first orifice 11 of the side extension 10. The same procedure is used on the other side of the blade 2. As stated in the description of the drawings, this embodiment would provide a little more leverage with respect to the scooping action, and doesn't require as much bending on the part of the user.

The above described configuration allows the user to basically place the blade 2 into the snow, sliding the entire device as well as the blade 2 horizontally forward into the snow, whereby the user merely has to vertically lift the blade 2 and toss the snow forward or to the side. The only bending that needs to take place should occur at the knees, as any knowledgeable doctor will advise. This configuration also allows the user to swing the blade 2 arcuately into the snow, where the blade 2 enters the snow in a relatively horizontal position, providing for the maximum cutting efficiency with the greatest applied torque arm. The first embodiment, depicted by FIG. 11, requires the user to place the blade 2 into the snow on an angle, whereby the user must pivot the handle 4 to lift the device and the snow up and out.

The maximum result, with minimal effort, should occur when the device is being used as a shovel in accordance with FIG. 11A. In a very methodical manner, the user should clear the top of the snow first, then work downward while taking small sections away at a time, until the user reaches the ground. The user should bend at the knees, slide the blade 2 into the snow, lift with the knees, and toss the snow forward or to the side.

At the end of the winter season, the user merely has to disconnect the extension poles 27 from the handle 4, then disconnect the side supports 18 from the handle 4, then finally disconnect the blade 2 and angle support 14 from the side supports 18. All of the parts can then be stored with relative ease, awaiting the first snowfall of the subsequent winter season. All of the moving parts are simple to assess, are in plain view, and require a minimal amount of mechanical know-how for assembly and disassembly. The simplicity of the design adds to its overall consumer appeal, comprising conventional connections with relatively standard-sized parts.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A snow moving device comprising:
   (a) a handle,
   (b) a planar rectangular blade incorporating a planar rectangular surface, a front edge, a back edge, and two side edges with raised side extensions extending at angles from the plane of the blade along both side edges of the blade,
   (c) a plurality of support arms, fixedly connected to the handle, forming a connection between the handle and the blade,
   (d) an arcuate opening or channel cut out of each side extension, and
   (e) means to pivotally and interchangeably connect the blade to the support arms through the arcuate opening or channels in each side extension of the blade allowing the blade to pivot on the support arms between a first position and a second position, with such first and second positions being variable and depending on the orientation of the blade with respect to the support arms.

2. A snow moving device in accordance with claim 1, wherein the connecting means additionally comprises:
   (f) a first pair of bolts connecting the support arms to the blade, and
   (g) a second pair of bolts connecting the support arms to the blade through the arcuate opening or channels in the blade so that the back edge of the blade is oriented away from the handle.

3. A snow moving device in accordance with claim 2, wherein the second pair of bolts slidably connects the support arms to the blade through the arcuate opening or channels, allowing the blade to pivot on the support arms between a first position slightly angularly displaced from the horizontal of the longitudinal axis of the handle as the device is moved away from a user, and a second position perpendicular to the longitudinal axis of the handle as the device is moved toward the user, for use of the device as a scraper.

4. A snow moving device in accordance with claim 2, wherein the second pair of bolts fastenably connects the support arms to the blade through the arcuate opening or channels, locking the blade in a position perpendicular to the longitudinal axis of the handle, for use of the device as a pusher or plow.

5. A snow moving device in accordance with claim 1, wherein the connecting means additionally comprises:
   (f) a first pair of bolts connecting the support arms to the blade, and
   (g) a second pair of bolts connecting the support arms to the blade through the arcuate opening or channels in the blade so that the back edge of the blade is oriented toward the handle.

6. A snow moving device in accordance with claim 5, wherein the second pair of bolts fastenably connects the support arms to the blade through the arcuate opening or channels, locking the blade in a position angularly displaced from the longitudinal axis of the handle, for use of the device as a shovel.

7. A snow moving device in accordance with claims 2 or 5, wherein the side extensions are curved, with the greatest curvature at the back edge of the blade, and the smallest curvature toward the front edge of the blade.

8. A snow moving device in accordance with claim 1, wherein the connecting means additionally comprises a first set of bolts fixedly connecting the support arms to the blade, and a second set of bolts fixedly connecting the support arms to the blade, neither of the sets of bolts extending through the arcuate opening or channels, for use of the device as a shovel.

9. A snow moving device in accordance with claim 1, wherein the handle is further partially comprised of means to attach or interlock a consecutive handle member to the handle in order to extend the distance between a user and the blade.

10. A snow moving device in accordance with claim 1, wherein the front edge of the planar rectangular blade additionally comprises means to protect a contacting surface from the front edge of the blade.

11. A snow moving device in accordance with claim 10, wherein the protective means further comprises a blade with the front edge slightly rounded.

12. A snow moving device in accordance with claim 10, wherein the protective means further comprises a blade with the front edge slightly upwardly curved.

13. A convertible manual snow removal apparatus comprising:
  (f) a supporting handle adapted for grasping by the hands of a user,
  (g) a blade means having a straight working edge at one end plus two raised edges substantially at right angles to the straight working edge,
  (h) bracket means adapted for connecting the handle to the blade means in at least partially rotatable relationship by fastening means including a fastening means in each raised edge about which the blade means is rotatable,
  (i) further fastening means in at least one raised edge limiting the rotation of the blade means to less than half a rotation,
  (j) the blade means being partially rotatably mountable in the bracket means in at least two configurations including with the raised edges directed toward the handle with the working edge directed away from the handle, and with the raised edges directed away from the handle with the working edge directed toward the handle.

14. A convertible manual snow removal apparatus in accordance with claim 13 wherein the further fastening means limits the rotation of the blade means to approximately half a rotation or approximately 60° from a first orientation to a second orientation.

15. A convertible manual snow removal apparatus in accordance with claim 14 wherein the further fastening means comprises an arcuate opening or channel.

16. A convertible manual snow removal apparatus in accordance with claim 15 wherein the fastening means are threaded fastening means.

17. A snow moving device comprising:
  (a) a handle,
  (b) a planar rectangular blade incorporating a planar rectangular surface, a front edge, a back edge, and two side edges with raised side extensions extending at angles from the plane of the blade along both side edges of the blade,
  (c) a plurality of support arms, fixedly connected to the handle, forming a connection between the handle and the blade,
  (d) an arcuate opening or channel cut out of each side extension, and
  (e) a first pair of bolts connecting the support arms to the blade and a second pair of bolts connecting the support arms to the blade through the arcuate opening or channels in the blade so that the back edge of the blade is oriented away from the handle,
  (f) wherein the second pair of bolts slidably connects the support arms to the blade through the arcuate opening or channels, allowing the blade to pivot on the support arms between a first position slightly angularly displaced from the horizontal of the longitudinal axis of the handle as the device is moved away from a user, and a second position perpendicular to the longitudinal axis of the handle as the device is moved toward the user, for use of the device as a scraper.

18. A snow moving device in accordance with claim 17 wherein the second pair of bolts fastenably connects the support arms to the blade through the arcuate opening or channels, locking the blade in a position perpendicular to the longitudinal axis of the handle, for use of the device as a pusher or plow.

19. A snow moving device comprising:
  (a) a handle,
  (b) a planar rectangular blade incorporating a planar rectangular surface, a front edge, a back edge, and two side edges with raised side extensions extending at angles from the plane of the blade along both side edges of the blade,
  (c) a plurality of support arms, fixedly connected to the handle, forming a connection between the handle and the blade,
  (d) an arcuate opening or channel cut out of each side extension, and
  (e) a first pair of bolts connecting the support arms to the blade and a second pair of bolts connecting the support arms to the blade through the arcuate opening or channels in the blade so that the back edge of the blade is oriented toward the handle,
  (f) wherein the second pair of bolts fastenably connects the support arms to the blade through the arcuate opening or channels, locking the blade in a position angularly displaced from the longitudinal axis of the handle, for use of the device as a shovel.

* * * * *